(12) United States Patent
Lee et al.

(10) Patent No.: US 11,631,536 B2
(45) Date of Patent: Apr. 18, 2023

(54) ELECTRONIC COMPONENT

(71) Applicant: SAMSUNG ELECTRO-MECHANICS CO., LTD., Suwon-si (KR)

(72) Inventors: Sang Moon Lee, Suwon-si (KR); Jae Young Na, Suwon-si (KR); Eun Kwang Lee, Suwon-si (KR); Won Hee Yoo, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

(21) Appl. No.: 17/380,343

(22) Filed: Jul. 20, 2021

(65) Prior Publication Data

US 2022/0157523 A1 May 19, 2022

(30) Foreign Application Priority Data

Nov. 16, 2020 (KR) .................. 10-2020-0153127

(51) Int. Cl.
*H01G 4/008* (2006.01)
*H01G 4/12* (2006.01)
*H01G 4/30* (2006.01)
*H01G 4/012* (2006.01)
*H01G 4/232* (2006.01)

(52) U.S. Cl.
CPC .......... *H01G 4/008* (2013.01); *H01G 4/0085* (2013.01); *H01G 4/012* (2013.01); *H01G 4/1209* (2013.01); *H01G 4/30* (2013.01); *H01G 4/232* (2013.01)

(58) Field of Classification Search
CPC ...... H01G 4/0085; H01G 4/008; H01G 4/012; H01G 4/30
See application file for complete search history.

(56) References Cited

U.S. PATENT DOCUMENTS

| | | | |
|---|---|---|---|
| 2012/0326559 | A1 | 12/2012 | Otsuka et al. |
| 2013/0321980 | A1 | 12/2013 | Suzuki et al. |
| 2015/0155098 | A1 | 6/2015 | Yamaguchi et al. |
| 2015/0170838 | A1 | 6/2015 | Suzuki et al. |

(Continued)

FOREIGN PATENT DOCUMENTS

| | | | |
|---|---|---|---|
| JP | 04312907 A | * | 11/1992 |
| JP | 06112083 A | * | 4/1994 |

(Continued)

*Primary Examiner* — Eric W Thomas
(74) *Attorney, Agent, or Firm* — Morgan, Lewis & Bockius LLP

(57) ABSTRACT

An electronic component includes a body including a plurality of dielectric layers, and a plurality of internal electrodes disposed with a corresponding one of the dielectric layers interposed therebetween; and an external electrode disposed on the body and connected to at least one of the plurality of internal electrodes. One of the plurality of internal electrodes includes an alloy metal including nickel, tin and aluminum. One of the plurality of internal electrodes includes a core internal electrode including a first surface and a second surface opposing each other, and a capping internal electrode disposed on the first surface of the core internal electrode and the second surface of the core internal electrode. The capping internal electrode includes a first alloy region including an alloy of nickel and aluminum.

17 Claims, 9 Drawing Sheets

(56) References Cited

U.S. PATENT DOCUMENTS

| | | |
|---|---|---|
| 2016/0155571 A1 | 6/2016 | Doi et al. |
| 2016/0276102 A1 | 9/2016 | Suzuki et al. |
| 2016/0358713 A1 | 12/2016 | Doi et al. |
| 2019/0103224 A1 | 4/2019 | Han et al. |
| 2019/0304696 A1 | 10/2019 | Kim et al. |
| 2020/0043658 A1* | 2/2020 | Choi .................... H01G 4/008 |
| 2021/0020363 A1 | 1/2021 | Song et al. |

FOREIGN PATENT DOCUMENTS

| | | |
|---|---|---|
| JP | 11067588 A * | 3/1999 |
| JP | 5527403 B2 | 6/2014 |
| JP | 2019-117901 A | 7/2019 |
| KR | 10-2013-0115357 A | 10/2013 |
| KR | 10-2015-0036391 A | 4/2015 |
| KR | 10-2015-0036428 A | 4/2015 |
| KR | 10-2016-0025574 A | 3/2016 |
| KR | 10-2016-0085296 A | 7/2016 |
| KR | 10-2016-0143517 A | 12/2016 |
| KR | 10-2019-0038237 A | 4/2019 |
| KR | 10-2019-0114165 A | 10/2019 |
| KR | 10-2019-0116133 A | 10/2019 |

* cited by examiner

ELECTRONIC COMPONENT

CROSS-REFERENCE TO RELATED APPLICATION(S)

This application claims benefit of priority to Korean Patent Application No. 10-2020-0153127 filed on Nov. 16, 2020 in the Korean Intellectual Property Office, the disclosure of which is incorporated herein by reference in its entirety.

TECHNICAL FIELD

The present disclosure relates to an electronic component and a method of manufacturing the same.

BACKGROUND

Among electronic components, a multilayer ceramic capacitor (MLCC) may be a chip-type condenser mounted on printed circuit boards of various electronic products such as imaging devices including a liquid crystal display (LCD), computers, smartphones, and mobile phones, and charging or discharging electricity.

A multilayer capacitor may be used as a component of various electronic devices as a multilayer capacitor may have a small size and high capacitance, and may be easily mounted. Recently, as components of electronic devices have been miniaturized, demand for miniaturization and high capacitance of multilayer capacitors has been increased.

A multilayer capacitor may include a plurality of dielectric layers and a plurality of internal electrodes alternately disposed with the dielectric layers interposed therebetween.

SUMMARY

According to an aspect of the present disclosure, tin (Sn) may be used as an additive to improve properties of an internal electrode. Tin added to an internal electrode may improve reliability (e.g., high temperature load lifespan and connectivity of an internal electrode). However, tin may diffuse from an internal electrode to a dielectric layer, and tin diffused into a dielectric layer may react with oxygen included in a dielectric layer, which may cause a decrease in capacitance.

An aspect of the present disclosure is to provide an electronic component having improved reliability.

Another aspect of the present disclosure is to provide a method of manufacturing an electronic component having improved reliability.

According to an aspect of the present disclosure, an electronic component includes a body including a plurality of dielectric layers, and a plurality of internal electrodes disposed with a corresponding one of the plurality of dielectric layers interposed therebetween; and an external electrode disposed on the body and connected to at least one of the plurality of internal electrodes. One of the plurality of internal electrodes includes an alloy metal including nickel, tin and aluminum. The one of the plurality of internal electrodes includes a core internal electrode including a first surface and a second surface opposing each other, and a capping internal electrode disposed on the first surface of the core internal electrode and the second surface of the core internal electrode. The capping internal electrode includes a first alloy region including an alloy of nickel and aluminum.

According to another aspect of the present disclosure, an electronic component includes a body including a plurality of dielectric layers, and a plurality of internal electrodes disposed with a corresponding one of the dielectric layers interposed therebetween; and an external electrode disposed on the body and connected to at least one of the plurality of internal electrodes. One of the plurality of internal electrodes includes an alloy metal including nickel, tin and aluminum. The one of the plurality of internal electrodes includes a core internal electrode including a first surface and a second surface opposing each other, and a capping internal electrode disposed on the first surface of the core internal electrode and the second surface of the core internal electrode. The capping internal electrode includes a first alloy region including an alloy of nickel and aluminum, and a second alloy region including an alloy of nickel and tin. An area of the first alloy region covering the first surface of the core internal electrode is larger than an area of the second alloy region covering the first surface of the core internal electrode.

According to another aspect of the present disclosure, a method of manufacturing an electronic component includes forming a non-sintered body including a plurality of non-sintered dielectric layers, and a non-sintered internal electrode formed by applying a conductive paste including nickel and an alloy metal to one of the plurality of non-sintered dielectric layers; and forming a baked body and an internal electrode by baking the non-sintered body. The internal electrode includes a core internal electrode including a first surface and a second surface opposing each other, and a capping internal electrode disposed on the first surface of the core internal electrode and the second surface of the core internal electrode. The alloy metal includes aluminum and tin. The core internal electrode is a baked electrode formed of nickel. The capping internal electrode includes a first alloy region including an alloy of nickel and aluminum.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
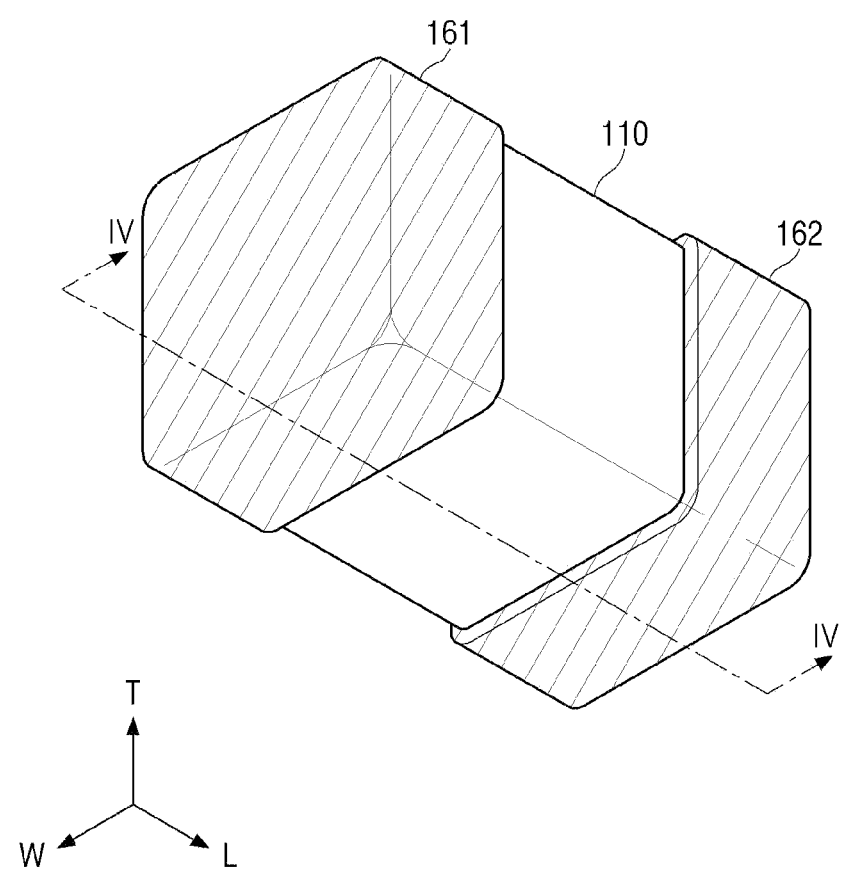
FIG. 1 is a perspective diagram illustrating an electronic component according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

The configuration in which an element or layer is referred to as being disposed "on" another element or layer may include the configuration in which another layer or another element is interposed therebetween, as well as being directly disposed on another element or layer. The configuration in which an element is referred to as being "directly on" indicates that no other element or layer is interposed therebetween.

The spatially relative terms "below," "beneath," "lower," "above," and "upper," spatially relative terms, may be used to easily describe correlation between elements. Spatially relative terms may include different directions of an element while being used or operating in addition to the directions illustrated in the drawings. For example, when an element illustrated in the drawings is upside down, an element described as "below" or "beneath" another element may be placed "above" another element. Accordingly, an example term "below" may include both directions of below and above. An element may be oriented in other directions, and accordingly, spatially relative terms may be interpreted according to the orientation.

The terms "first," "second," and the like may be used to describe various elements, and/or sections, elements, and/or sections are not limited to the terms. These terms are only used to distinguish one element or section from another element or section. Therefore, a first element, a first element, or a first section mentioned below may be a second element, a second element, or a second section in example embodiments.

Figure 2:
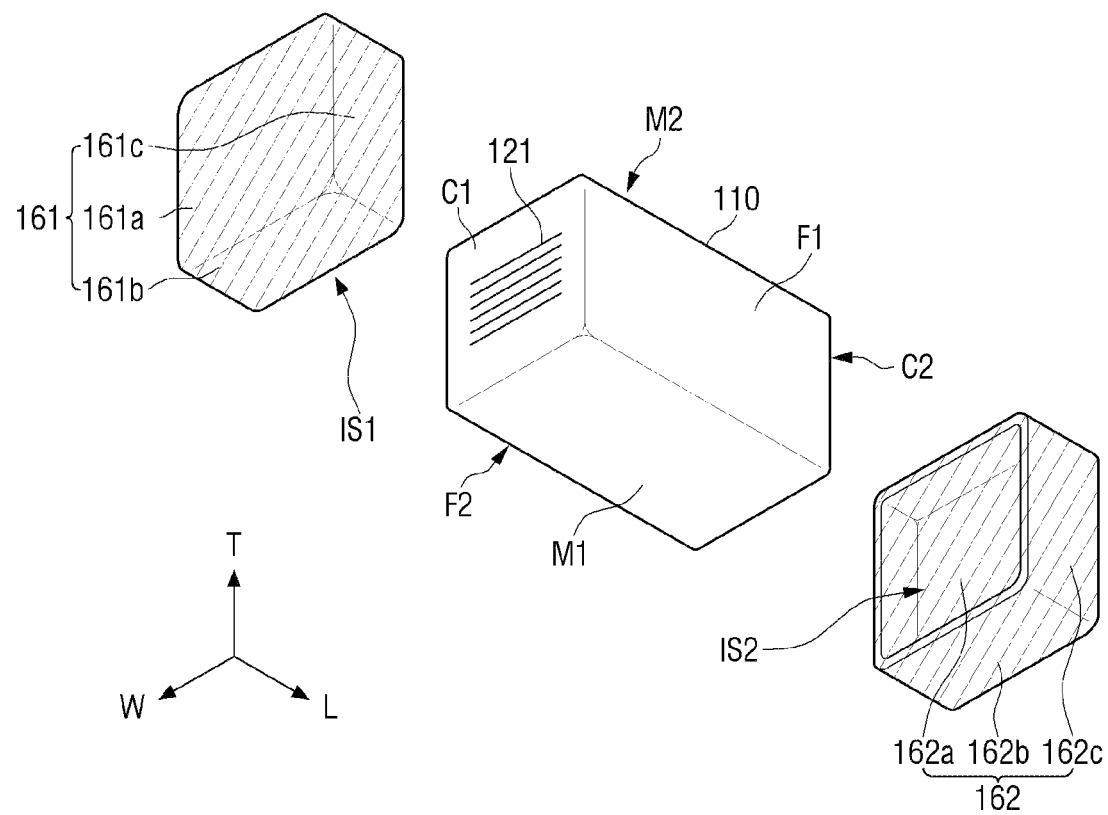
FIG. 2 is an exploded perspective diagram illustrating the electronic component in FIG. 1.
Figure 3:
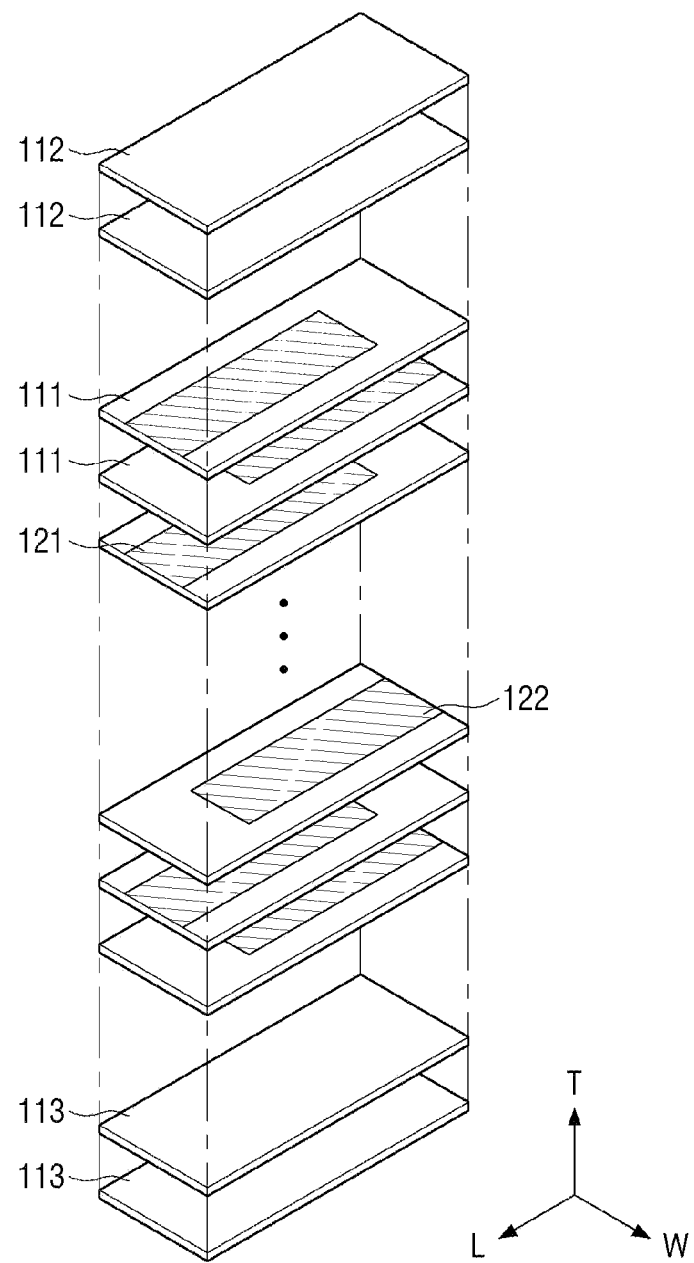
FIG. 3 is an exploded perspective diagram illustrating a body of the electronic component in FIG. 1.
Figure 4:
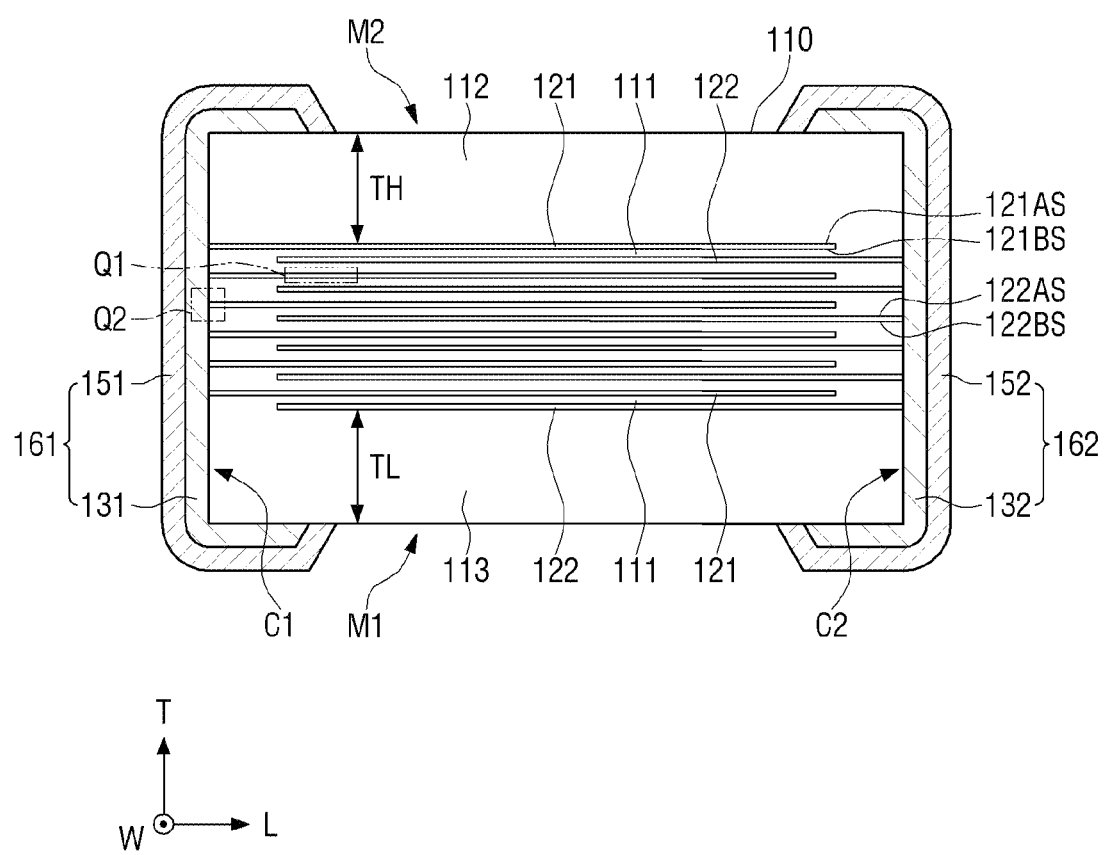
FIG. 4 is a cross-sectional diagram taken along line IV-IV in FIG. 1.

FIG. 1 is a perspective diagram illustrating an electronic component according to an example embodiment. FIG. 2 is an exploded perspective diagram illustrating the electronic component in FIG. 1. FIG. 3 is an exploded perspective diagram illustrating a body of the electronic component in FIG. 1. FIG. 4 is a cross-sectional diagram taken along line IV-IV in FIG. 1.

Referring to FIGS. 1, 2 and 4, an electronic component 100 in an example embodiment may include a body (or a ceramic body) 110, a first external electrode 161, and a second external electrode 162.

The body 110 may have, for example, a hexahedral shape. For example, the body 110 may include six surfaces M1, M2, F1, F2, C1, and C2, as illustrated in FIG. 2. The first and second surfaces M1 and M2 may oppose each other in a third direction T (or in a thickness direction of the body 110). When the electronic component 100 is mounted on a substrate, the first surface M1 or the second surface M2 may be a surface mounted on the substrate (a mounting surface). The third and fourth surfaces F1 and F2 may oppose each other in a second direction W (or in a width direction of the body 110). The third and fourth surfaces F1 and F2 may be connected to the first and second surfaces M1 and M2. The fifth and sixth surfaces C1 and C2 may oppose each other in a first direction L (or in a length direction of the body 110). The fifth and sixth surfaces C1 and C2 may be connected to the first surface M1, the second surface M2, the third surface F1, and the fourth surface F2.

As illustrated in FIG. 3, the body 110 may include a plurality of dielectric layers 111, a plurality of first internal electrodes 121, and a plurality of second internal electrodes 122. In other words, a plurality of dielectric layers 111 may be laminated, and a plurality of first internal electrodes 121 and a plurality of second internal electrodes 122 may be alternately disposed with the dielectric layer 111 interposed therebetween.

The plurality of dielectric layers 111 may be in a sintered state, and may be integrated such that boundaries between adjacent layers may not be distinct.

The dielectric layer 111 may include a ceramic material having a high dielectric constant, and may include, for example, barium titanate ($BaTiO_3$) powder or strontium titanate ($SrTiO_3$) powder, but an example embodiment thereof is not limited thereto. In other words, any material which may obtain sufficient electrostatic capacitance may be used. Also, a ceramic additive, an organic solvent, an organic binder, a plasticizer, a binder, and a dispersant may be selectively further added to the dielectric layer 111 along with the ceramic powder. Ceramic additives may include transition metal oxides or carbides, rare earth elements, magnesium (Mg) or aluminum (Al), but an example of the ceramic additives are not limited thereto.

The plurality of first internal electrodes 121 may overlap the plurality of second internal electrodes 122 in the third direction T (or in the thickness direction of the body 110), and an area of overlap may be related to the formation of capacitance of the capacitor.

The first internal electrode 121 may include a first surface 121AS and a second surface 121BS opposing the first surface 121AS in the third direction T. The first surface 121AS of the first internal electrode 121 may be more adjacent to the second surface M2 of the body 110 than the second surface 121BS of the first internal electrode 121. The first surface 121AS and the second surface 121BS of the first internal electrode 121 may oppose the dielectric layer 111.

The second internal electrode 122 may include a first surface 122AS and a second surface 122BS opposing the first surface 122AS in the third direction T. The first surface 122AS of the second internal electrode 122 may be more adjacent to the second surface M2 of the body 110 than the second surface 122BS of the second internal electrode 122. The first surface 122AS and the second surface 122BS of the second internal electrode 122 may oppose the dielectric layer 111.

The first internal electrode 121 and the second internal electrode 122 may include nickel (Ni) as a main component, and may include an additive as below.

As an additive, to improve reliability of the internal electrodes 121 and 122, the internal electrodes 121 and 122 may include an alloy metal having a melting point lower than that of nickel (Ni). The alloying metal may include tin (Sn) and aluminum (Al). When a weight of nickel (Ni) included in the internal electrodes 121 and 122 is 100, a weight of the alloy metal included in the internal electrodes 121 and 122 may be 0.1 or more and 15 or less. In other words, the alloy metal may be included in the internal electrodes 121 and 122 in an amount of 0.1 weight % or more and 15 weight % or less based on 100 weight % of nickel.

Also, the internal electrodes 121 and 122 may further include at least one material selected from a group including copper (Cu), silver (Ag), lead (Pb), platinum (Pt), rhodium (Rh), iridium (Ir), ruthenium (Ru), osmium (Os), indium (In), gallium (Ga), zinc (Zn), and bismuth (Bi), but an example embodiment thereof is not limited thereto. Also, to obtain a uniform composition of an interfacial of the internal electrodes 121 and 122, the internal electrodes 121 and 122 may further include at least one material selected from a group including barium (Ba), magnesium (Mg), dysprosium (Dy), and titanium (Ti).

As illustrated in FIG. 4, the plurality of first internal electrodes 121 may be exposed to (or be in contact with or extend from) the fifth surface C1 and may be electrically connected to the first external electrode 161. The plurality of second internal electrodes 122 may be exposed to (or be in contact with or extend from) the sixth surface C2 and may be electrically connected to the second external electrode 162. When a voltage is applied to the first and second external electrodes 161 and 162, electric charges may be accumulated between the first and second internal electrodes 121 and 122 opposing each other.

The body 110 may further include a lower cover layer 113 disposed below a lowermost internal electrode among the plurality of first internal electrodes 121 and the plurality of second internal electrodes 122. Also, the body 110 may further include an upper cover layer 112 disposed above an uppermost internal electrode among the plurality of first internal electrodes 121 and the plurality of second internal electrodes 122. The lower cover layer 113 and the upper cover layer 112 may be sintered together with the plurality of dielectric layers 111 and may be integrated such that a boundary between adjacent layers may not be distinct.

The lower cover layer 113 and the upper cover layer 112 may be formed by laminating a single dielectric layer or two or more dielectric layers in the third direction T (e.g., in the thickness direction of the body 110). The lower cover layer 113 and the upper cover layer 112 may prevent damages to the first internal electrode 121 and the second internal electrode 122 from physical/chemical stress. Also, to remove a mounting directivity, a thickness TL of the lower cover layer 113 and a thickness TH of the upper cover layer 112 may be configured to be the same, but an example embodiment thereof is not limited thereto. The lower cover layer 113 or the upper cover layer 112 may have the same material and the same configuration as those of the dielectric layer 111, but an example embodiment thereof is not limited thereto.

A shape and a dimension of the body 110, the number of the laminated dielectric layers 111, the number of the laminated first internal electrode 121/second internal electrode 122, the thicknesses TL and TH of the lower/upper cover layers 113 and 112 may be varied, and are not limited to the example illustrated in the drawings.

Referring back to FIGS. 1, 2, and 4, the first external electrode 161 may include a first connection portion 161a, a first mounting portion 161b, and a first side portion 161c. The first connection portion 161a may be disposed on the fifth surface C1 of the body 110 and may be connected to the plurality of first internal electrodes 121 exposed to the fifth surface C1. The first mounting portion 161b may extend from the first connection portion 161a to the first surface M1 and the second surface M2 of the body 110. The first side portion 161c may extend from the first connection portion 161a to the third surface F1 and the fourth surface F2 of the body 110. In other words, the first mounting portion 161b may be parallel to a plane formed by the first internal electrode 121, and the first side portion 161c may be perpendicular to a plane formed by the first internal electrode 121.

The first mounting portion 161b disposed on the first surface M1 of the body 110 and the first mounting portion 161b disposed on the second surface M2 of the body 110 may be symmetrical to each other in the third direction T. For example, a length of the first mounting portion 161b disposed on the first surface M1 of the body 110 in the first direction L (or the second direction W) may be the same as a length of first mounting portion 161b disposed on the second surface M2 of the body 110 in the first direction L (or the second direction W).

Similarly, the first side portion 161c disposed on the third surface F1 of the body 110 and the first side portion 161c disposed on the fourth surface F2 of the body 110 may be symmetrical to each other in the second direction W. In other words, a length of the first side portion 161c disposed on the third surface F1 of the body 110 in the first direction L (or the third direction T) may be the same as a length of the first side portions 161c disposed on the fourth surface F2 of the body 110 in the first direction L (or the third direction T).

Similarly, the second external electrode 162 may include a second connection portion 162a, a second mounting portion 162b, and a second side portion 162c. The second connection portion 162a may be disposed on the sixth surface C2 of the body 110 and may be connected to the plurality of second internal electrodes 122 exposed to the sixth surface C2. The second mounting portion 162b may extend from the second connection portion 162a to the first surface M1 and the second surface M2 of the body 110. The second side portion 162c may extend from the second connection portion 162a to the third surface F1 and the fourth surface F2 of the body 110. In other words, the second mounting portion 162b may be parallel to a plane formed by the second internal electrode 122, and the second side portion 162c may be perpendicular to a plane formed by the second internal electrode 122.

The second mounting portion 162b disposed on the first surface M1 of the body 110 and the second mounting portion 162b disposed on the second surface M2 of the body 110 may be symmetrical to each other in the third direction T. The second side portion 162c disposed on the third surface F1 of the body 110 and the second side portion 162c disposed on the fourth surface F2 of the body 110 may be symmetrical to each other in the second direction W.

As described above, the first mounting portion 161b/the second mounting portion 162b formed on the first surface M1 of the body 110 may be symmetrical to the first mounting portion 161b/the second mounting portion 162b formed on the second surface M2 of the body 110, the thickness TL of the lower cover layer 113 and the thickness TH of the upper cover layer 112 may be the same. Accordingly, when the electronic component 100 is mounted on a substrate, the mounting directivity may be eliminated. In other words, the first surface M1 of the body 110 may be mounted to oppose the substrate, or the second surface M2 of the body 110 may be mounted to oppose the substrate.

The first connection portion 161a, the first mounting portion 161b, and the first side portion 161c of the first external electrode 161 may be formed by the same process (or a single process), and thicknesses of the first connection portion 161a, the first mounting portion 161b, and the first side portion 161c may be substantially the same. The thicknesses of the first connection portion 161a, the first mounting portion 161b, and the first side portion 161c refer to an average thickness. The expression "the thicknesses may be the same" may indicate that an example in which the thicknesses may be completely the same, and also an example in which the thicknesses may be slightly different due to a process error.

The first connection portion 161a and the first side portion 161c may be integrally connected to each other. The first connection portion 161a may be directly connected to the first side portion 161c without a medium. Similarly, the first connecting portion 161a and the first mounting portion 161b may be integrally connected to each other, and the first side portion 161c and the first mounting portion 161b may be integrally connected to each other. Alternatively, at least two of the first connection portion 161a, the first mounting portion 161b, and the first side portion 161c may be directly in contact with each other.

Similarly, the thicknesses of the second connection portion 162a, the second mounting portion 162b, and the second side portion 162c of the second external electrode 162 may be substantially the same. Also, at least two of the second connection portion 162a, the second mounting portion 162b, and the second side portion 162c may be integrally connected to each other. Alternatively, at least two of the second connection portion 162a, the second mounting portion 162b, and the second side portion 162c may be directly in contact with each other.

One end of the body 110 may be disposed in the first internal space IS1, and the other end of the body 110 may be disposed in the second internal space IS2.

The first external electrode 161 may define the first internal space IS1. The first internal space IS1 may be determined by the first connection portion 161a, and the first mounting portion 161b and the first side portion 161c bent from the first connection portion 161a. A space surrounded by the first connection portion 161a, the first mounting portion 161b, and the first side portion 161c may be configured as the first internal space IS1. Specifically, the first connection portion 161a may have a rectangular shape, and the first mounting portion 161b/the first side portion 161c may be perpendicularly bent from respective sides of the first connection portion 161a having a rectangular shape and may extend toward the second external electrode 162.

The second external electrode 162 may define the second internal space IS2. The second internal space IS2 may be determined by the second connection portion 162a and the second mounting portion 162b and the second side portion 162c bent from the second connection portion 162a. A space surrounded by the second connection portion 162a, the second mounting portion 162b, and the second side portion 162c may be configured as the second internal space IS2. Specifically, the second connection portion 162a may have a rectangular shape, and the second mounting portion 162b/ the second side portion 162c may be perpendicularly bent from respective sides of the second connection portion 162a having a rectangular shape and may extend toward the first external electrode 161.

Also, the first external electrode 161 and the second external electrode 162 may be configured to be symmetrical around a central portion of the body 110.

For example, the first mounting portion 161b of the first external electrode 161 disposed on the first surface M1 of the body 110 and the second mounting portion 162b of the second external electrode 162 disposed on the first surface M1 of the body 110 may be symmetrical to each other in the first direction L. Also, the first side portion 161c of the first external electrode 161 disposed on the third surface F1 of the body 110 and the second side portion 162c of the second external electrode 162 disposed on the third surface F1 of the body 110 may be symmetrical to each other in the first direction L. Also, the first connection portion 161a of the first external electrode 161 disposed on the fifth surface C1 of the body 110 and the second connection portion 162a of the second external electrode 162 disposed on the sixth surface C2 of the body 110 may be symmetrical to each other in the first direction L.

Referring to FIG. 4, the first external electrode 161 may include a first electrode layer 131 and a first plating layer 151 laminated in order.

The first electrode layer 131 may include a conductive metal, such as, for example, at least one material among copper (Cu), nickel (Ni), gold (Au), silver (Ag), platinum (Pt), and palladium (Pd) or alloys thereof, but an example embodiment thereof is not limited thereto. Also, the first electrode layer 131 may include glass as an auxiliary material. The conductive metal may ensure chip sealing properties and electrical connectivity with a chip, and glass may fill an empty space when a metal is sintered and reduced, and may also provide a bonding force between the first external electrode 161 and the body 110.

The first plating layer 151 may be configured as laminated nickel (Ni)/tin (Sn) plating layers or laminated nickel (Ni)/ gold (Au) plating layers, but an example embodiment thereof is not limited thereto. The first plating layer 151 may improve contact properties with solder when being mounted on a substrate.

The second external electrode 162 may also include a second electrode layer 132 and a second plating layer 152 laminated in order. The second electrode layer 132 may be formed of substantially the same material and the same structure as those of the first electrode layer 131, and the second plating layer 152 may be formed of substantially the same material and the same structure as those of the first plating layer 151.

In the description below, the structure/shape of the first internal electrode 121 will be described in detail with reference to FIGS. 4 to 6. Although not described, the structure/shape of the second internal electrode 122 may be substantially the same as the structure/shape of the first internal electrode 121.

Figure 5:
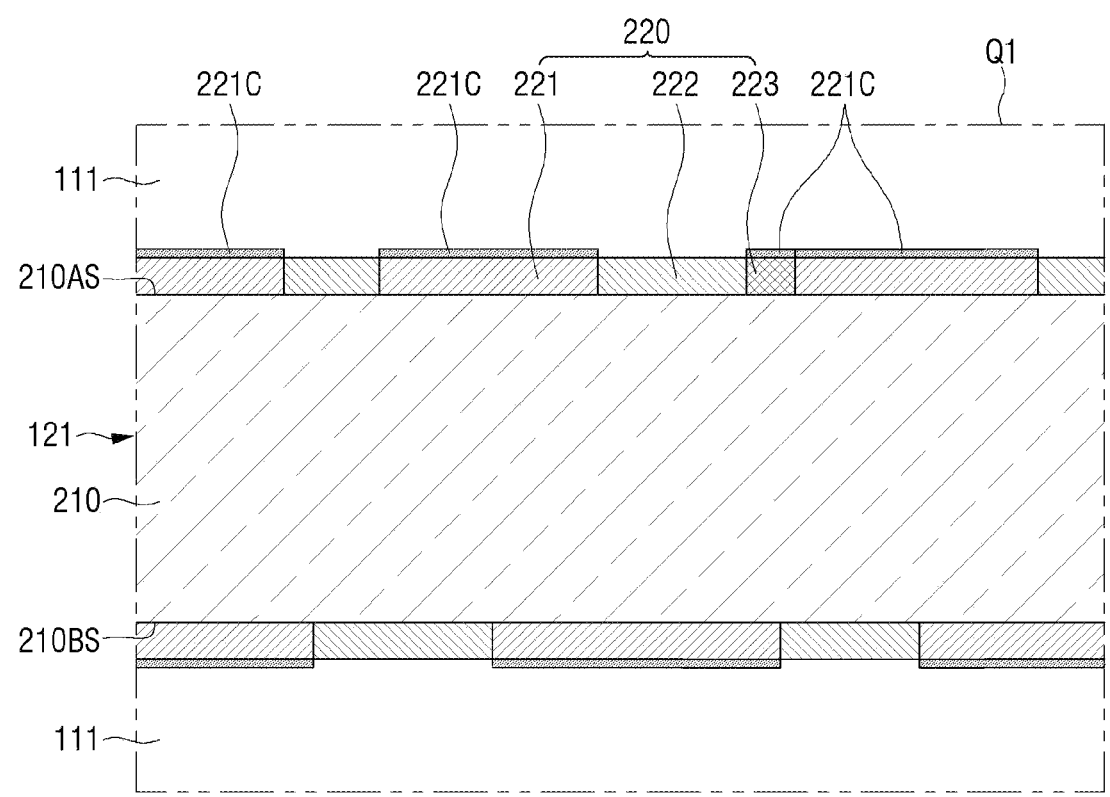
FIG. 5 is an enlarged cross-sectional diagram illustrating region Q1 in FIG. 4.

FIG. 5 is an enlarged cross-sectional diagram illustrating region Q1 in FIG. 4. FIG. 6 is an enlarged cross-sectional diagram illustrating region Q2 in FIG. 4.

Figure 6:
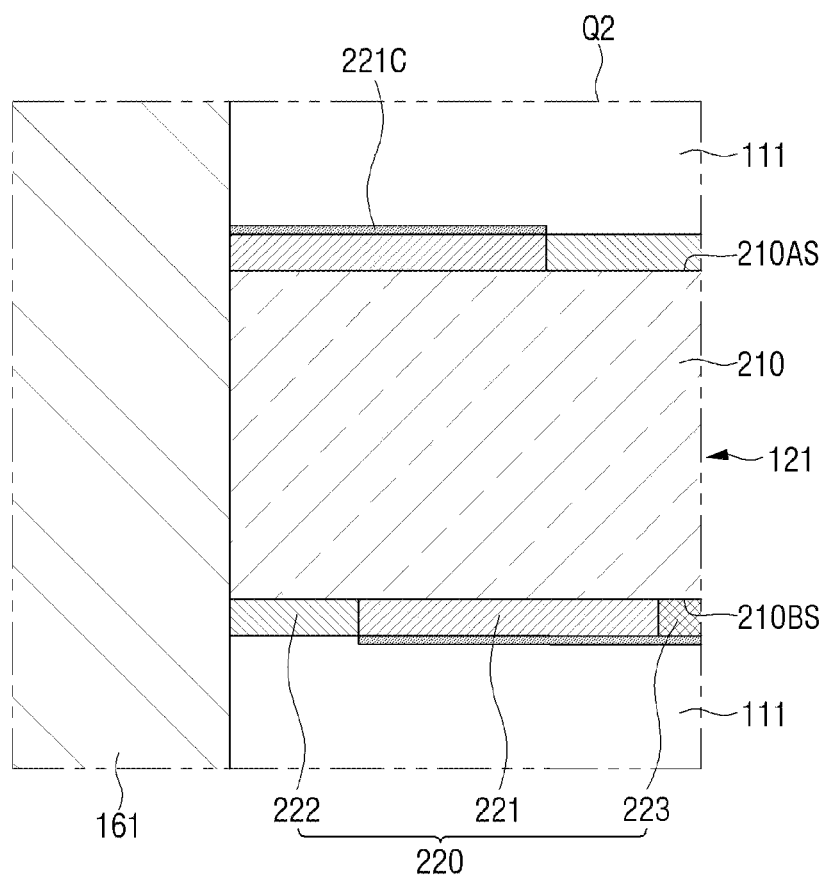
FIG. 6 is an enlarged cross-sectional diagram illustrating region Q2 in FIG. 4.

Referring to FIGS. 4 to 6, the first internal electrode 121 may be disposed between corresponding dielectric layers 111. The first internal electrode 121 may include a core internal electrode 210 and a capping internal electrode 220.

Specifically, the core internal electrode 210 may include a first surface 210AS and a second surface 210BS opposing each other. The first surface 210AS of the core internal electrode 210 may oppose the second surface 210BS of the core internal electrode 210 in the third direction T. The first surface 210AS of the core internal electrode 210 and the second surface 210BS of the core internal electrode 210 are illustrated as planar for ease of description, but an example embodiment thereof is not limited thereto.

The core internal electrode 210 may be configured as a baked electrode formed of nickel (Ni), a main component of the first internal electrode 121. The core internal electrode 210 may be formed by backing nickel included in a conductive paste in a sintering process for forming the body 110. Here, the "baked electrode formed of nickel" may include an electrode only formed of nickel, and also an electrode in which the above-described additives are partially included in the nickel electrode.

The capping internal electrode 220 may be disposed on the first surface 210AS of the core internal electrode 210 and on the second surface 210BS of the core internal electrode 210.

In the electronic component in example embodiments, the capping internal electrode 220 may be disposed throughout the first surface 210AS of the core internal electrode 210 and the second surface 210BS of the core internal electrode 210. In other words, the first surface 121AS of the first internal electrode 121 and the second surface 121BS of the first internal electrode 121 may be defined by the capping internal electrode 220.

The capping internal electrode 220 may include a first alloy region 221, a second alloy region 222, and a third alloy region 223. The first alloy region 221 may include an alloy of nickel and aluminum. The second alloy region 222 may include an alloy of nickel and tin. The third alloy region 223 may include an alloy of nickel, aluminum, and tin.

The first alloy region 221 does not refer to an alloy formed of nickel and aluminum in a specific ratio. For example, when the capping internal electrode 220 includes $Al_3Ni$ and $Al_3Ni_2$, both $Al_3Ni$ and $Al_3Ni_2$ may be included in the first alloy region 221.

In the electronic component in an example embodiment, an area ratio of the first alloy region 221 may be different from an area ratio of the second alloy region 222. In other words, an area of the first alloy region 221 covering the first surface 210AS of the core internal electrode 210 and the second surface 210BS of the core internal electrode 210 may be different from an area of the second alloy region 222 covering the first surface 210AS of the core internal electrode 210 and the second surface 210BS of the core internal electrode 210.

For example, an area ratio of the first alloy region 221 may be greater than an area ratio of the second alloy region 222. In other words, an area of the first alloy region 221 covering the first surface 210AS of the core internal electrode 210 and the second surface 210BS of the core internal electrode 210 may be greater than an area of the second alloy region 222 covering the first surface 210AS of the core internal electrode 210 and the second surface 210BS of the core internal electrode 210.

The "area ratio of the first alloy region 221" may refer to an area of the first surface 121AS of the first internal electrode 121 and the second surface 121BS of the first internal electrode 121 defined by the first alloy region 221. For example, the area may be measured by observing a cross-sectional diagram (LT cross-sectional diagram) and/or a TW cross-sectional diagram as in FIG. 4. After imaging an LT cross-sectional surface and/or a TW cross-sectional, an area fraction may be calculated by analyzing the measurement using image analysis software (National Institute of Sanitation (NIH) open source, "Image J" or MathWorks, "MATLAB"), etc., but an example embodiment thereof is not limited thereto.

The reason why the area ratio of the first alloy region 221 is greater than the area ratio of the second alloy region 222 is that the first alloy region 221 may be formed more easily than the second alloy region 222. For example, when the weight % of aluminum (Al) included in the first internal electrode 121 is greater than the weight % of tin (Sn) included in the first internal electrode 121, the first alloy region 221 may be formed more easily than the second alloy region 222. Specifically, in the first internal electrode 121, the weight % of aluminum (Al) relative to 100 weight % of nickel may be greater than the weight % of tin (Sn) relative to 100 weight % of nickel.

The first internal electrode 121 may include a capping internal electrode 220 and an aluminum oxide film 221c disposed between the dielectric layers 111. For example, the aluminum oxide film 221c may be formed by reaction between aluminum and oxygen eluted during baking of the body 110. As another example, the aluminum oxide film 221c may be formed by reaction between aluminum and oxygen included in the first alloy region 221 and the third alloy region 223.

For example, the aluminum oxide film 221c may be disposed on the first alloy region 221 and/or the third alloy region 223, but an example embodiment thereof is not limited thereto. Differently from the illustrated example, when aluminum is eluted between the second alloy region 222 and the dielectric layer 111 during baking of the body 110, the aluminum oxide film 221c may also be disposed on the second alloy region 222.

Since the first internal electrode 121 includes tin (Sn) and aluminum (Al), which may be alloy metals, the capping internal electrode 220 may be formed between the first internal electrode 121 and the dielectric layer 111. The capping internal electrode 220 may prevent necking of nickel (Ni), which may be a main component of the first internal electrode 121. Accordingly, connectivity of the first internal electrode 121 may improve.

Also, aluminum (Al) may have a greater oxidization tendency than that of nickel (Ni) and tin (Sn). In other words, aluminum may more easily form oxides by reacting with oxygen than nickel (Ni) and tin (Sn). Aluminum included in the first internal electrode 121 may prevent nickel (Ni) and tin (Sn) from reacting with oxygen. Accordingly, aluminum included in the first internal electrode 121 may prevent nickel of the core internal electrode 210 from being oxidized.

Also, aluminum included in the first internal electrode 121 may prevent tin from being oxidized. When tin form an oxide by reacting with oxygen of the dielectric layer 111, dielectric loss may occur in the dielectric layer 111. Aluminum included in the first internal electrode 121 may reduce dielectric loss of the dielectric layer 111.

Also, the aluminum oxide film 221c included in the first internal electrode 121 may have a histologically dense structure. The aluminum oxide film 221c may prevent oxygen from permeating into the first internal electrode 121 or may reduce oxygen. Also, the aluminum oxide film 221c may prevent moisture ($H_2O$) from permeating into the first internal electrode 121 or may reduce moisture. Accordingly, in a high temperature or high temperature and high humidity environment, corrosion resistance of the first internal electrode 121 may improve.

Differently from the illustrated example, for example, the capping internal electrode 220 may not include the third alloy region 223. As another example, the capping internal electrode 220 may include the first alloy region 221, and may not include the second alloy region 222 and the third alloy region 223. As another example, the capping internal electrode 220 may not include the second alloy region 222.

The first internal electrode 121 may be in contact with the first external electrode 161 (the first electrode layer 131) through the fifth surface C1 of the body 110. The first external electrode 161 may be in contact with the core internal electrode 210 and the capping internal electrode 220.

Figure 7:
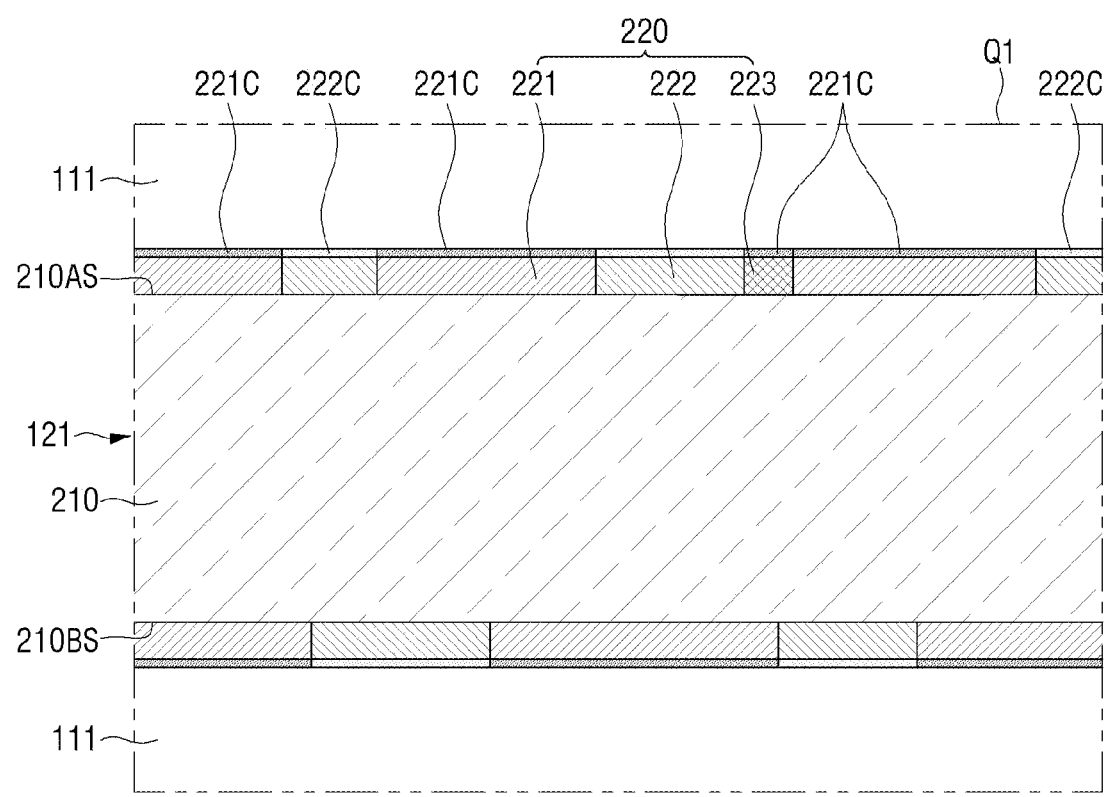
FIG. 7 is a cross-sectional diagram illustrating an electronic component according to another example embodiment.

FIG. 7 is a cross-sectional diagram illustrating an electronic component according to another example embodiment. For ease of description, differences from the examples described with reference to FIGS. 1 to 6 will be mainly described.

Referring to FIG. 7, in an electronic component in another example embodiment, the first internal electrode 121 may include a capping internal electrode 220, and a tin oxide film 222c disposed between dielectric layers 111.

As an example, the tin oxide film 222c may be formed by reaction between tin and oxygen eluted during baking of the body 110. As another example, the tin oxide film 222c may be formed by reaction between tin and oxygen included in the second alloy region 222.

For example, the tin oxide film 222c may be disposed on the second alloy region 222, but an example embodiment thereof is not limited thereto. When tin is eluted between the first alloy region 221 and the dielectric layer 111 in the baking of the body 110, the tin oxide film 222c may also be disposed on the first alloy region 221.

An area ratio of the first alloy region 221 may be greater than an area ratio of the second alloy region 222. Therefore, differently from the example in which the second alloy region 222 covers the first surface 210AS of the core internal electrode 210 and the second surface 210BS of the core internal electrode 210, the dielectric loss of the dielectric layer 111 may be reduced by forming the tin oxide film 222c.

Figure 8:
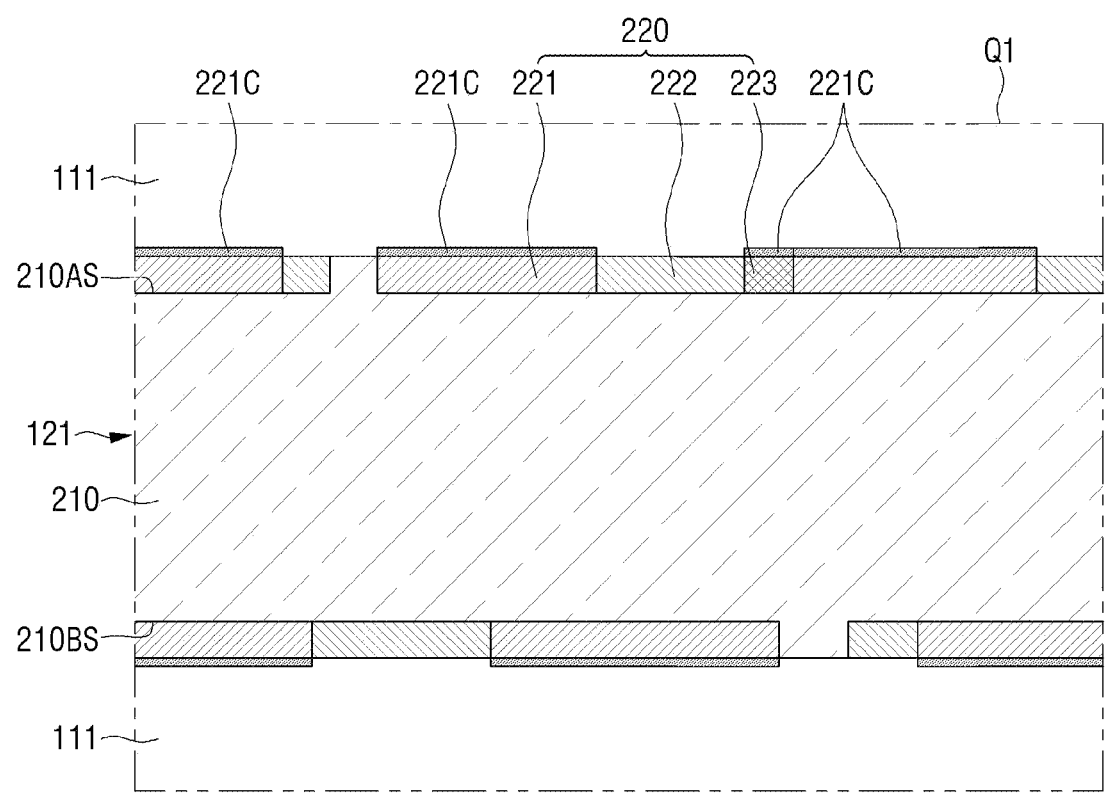
FIG. 8 is a cross-sectional diagram illustrating an electronic component according to another example embodiment.

FIG. 8 is a cross-sectional diagram illustrating an electronic component according to another example embodiment. For ease of description, differences from the examples described with reference to FIGS. 1 to 6 will be mainly described.

Referring to FIG. 8, in an electronic component in another example embodiment, the capping internal electrode 220 may define 80% or more of the first surface 121AS of the first internal electrode 121. The capping internal electrode 220 may define 80% or more of the second surface 121BS of the first internal electrode 121.

The capping internal electrode 220 may be disposed on a portion of the first surface 210AS of the core internal electrode 210 and the second surface 210BS of the core internal electrode 210. The capping internal electrode 220 may cover 80% or more of the first surface 210AS of the core internal electrode 210. The capping internal electrode 220 may cover 80% or more of the second surface 210BS of the core internal electrode 210.

A portion of the first surface 121AS of the first internal electrode 121 and a portion of the second surface 121BS of the first internal electrode 121 may be defined by the core internal electrode 210.

Figure 9:
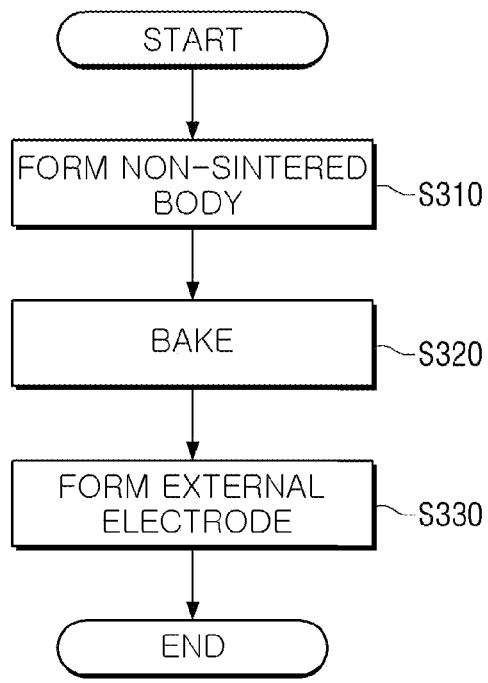
FIG. 9 is a flowchart illustrating a method of manufacturing an electronic component according to an example embodiment.
Figure 10:
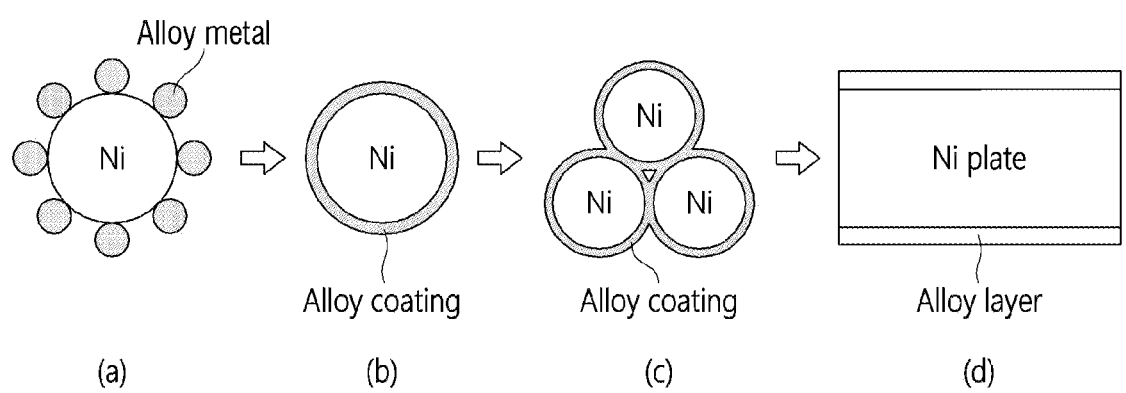
FIG. 10 is a diagram illustrating process S320 in FIG. 9.

A portion of the core internal electrode 210 may oppose the dielectric layer 111, and nickel of the core internal electrode 210 may be prevented from being oxidized by the first alloy region 221 and the aluminum oxide film 221c, FIG. 9 is a flowchart illustrating a method of manufacturing an electronic component according to an example embodiment. FIG. 10 is a diagram illustrating process S320 in FIG. 9.

Referring to FIG. 9, a non-sintered body may be formed (S310).

Specifically, a plurality of ceramic green sheets may be prepared, and a conductive paste may be applied to each ceramic green sheet using a printing method such as a screen printing method or a gravure printing method.

The conductive paste may include nickel (Ni), tin (Sn) and aluminum (Al). The conductive paste may be formed using conductive powder.

For example, a powder mixture in which nickel powder, tin powder, and aluminum powder are mixed may be used as the conductive powder. As another example, a powder mixture in which nickel powder coated with one of tin and aluminum and powder formed of the other one of tin and aluminum are mixed may be used as the conductive powder. As another example, nickel powder coated with tin and aluminum may be used as the conductive powder.

Then, a plurality of ceramic green sheets may be laminated and may be pressed in a lamination direction such that the laminated ceramic green sheets and the conductive paste for internal electrodes may be compressed.

Subsequently, the compressed laminate may be cut out for each region corresponding to the body of a single multilayer capacitor, thereby manufacturing a non-sintered body. The completed non-sintered body may include a plurality of non-sintered dielectric layers and a non-sintered internal electrode formed of a conductive paste including nickel, tin, and aluminum on the non-sintered dielectric layer.

A heat treatment may be performed on the non-sintered body to burn a binder, and the body may be baked in a reducing atmosphere, thereby obtaining a sintered body 110 (S320).

Referring to (a) in FIG. 10, an alloy metal may include a metal having a melting point lower than that of nickel (Ni). The alloy metal may include aluminum (Al) and tin (Sn).

The alloy metal may form an interface with nickel (Ni). Tin may be oxidized in air, and aluminum may prevent oxidation of tin. Due to the oxidation properties of aluminum, wetting properties of tin on the nickel surface may increase.

Referring to (b) in FIG. 10, tin and aluminum may have lower melting points than that of nickel. Therefore, when baking is performed, the alloy metal including tin and aluminum may melt and may be wetted on nickel. Accordingly, alloy coating including aluminum and tin may be formed around nickel (Ni).

Referring to (c) in FIG. 10, as the baking proceeds, nickel (Ni) having an alloy coating formed thereon may adhere to each other. Nickel (Ni) may be connected through alloy coating.

Referring to (d) in FIG. 10, as the baking proceeds, an alloy coating around nickel (Ni) may be temporarily liquefied. After being liquefied, as the temperature is maintained, tin and aluminum may diffuse toward nickel (Ni).

When tin and aluminum diffuse to nickel (Ni), an average composition of tin and aluminum may decrease. With a decrease in the average composition of tin and aluminum, alloy coating and solidification of nickel (Ni) may proceed.

Also, nickel (Ni) may be agglomerated with each other, and may become a nickel baked electrode (Ni plate). While nickel (Ni) is agglomerated, tin and aluminum may be eluted out of the nickel baked electrode (Ni plate). Also, tin and/or aluminum may form an alloy with nickel, such that an alloy layer including an alloy of nickel and aluminum and/or an alloy of nickel and tin may be formed on the nickel baked electrode (Ni plate). The alloy layer may correspond to the capping internal electrode 220 in FIG. 5 (or in FIG. 7 or in FIG. 8), and the nickel baked electrode (Ni plate) may correspond to the core internal electrode 210 in FIG. 5 (or in FIG. 7 or in FIG. 8).

Referring back to FIG. 9, external electrodes may be formed on both end surfaces of the body 110 (S330). The external electrode may include an electrode layer using, for example, a copper paste including glass, and a nickel/tin plating layer on the electrode layer.

According to the aforementioned example embodiments, in the internal electrode of the electronic component, a nickel (Ni) sintered electrode may include a core internal electrode, and a capping internal electrode disposed on the surface of the core internal electrode. The capping internal electrode may include an alloy region of nickel (Ni) and tin (Sn), and an alloy region of nickel (Ni) and aluminum (Al). Aluminum included in the internal electrode may prevent nickel and tin from reacting with oxygen (O). Aluminum included in the internal electrode may react with oxygen and may form an aluminum oxide film, such that permeation of oxygen into the internal electrode may be prevented. Also, since the aluminum oxide film formed by the oxygenation reaction of aluminum has a dense structure, corrosion resistance of the internal electrode in a high temperature or high temperature/high humidity environment may improve.

While the example embodiments have been illustrated and described above, it will be apparent to those skilled in the art that modifications and variations could be made without departing from the scope of the present invention as defined by the appended claims.

What is claimed is:

1. An electronic component, comprising:
   a body including a plurality of dielectric layers, and a plurality of internal electrodes disposed with a corresponding one of the plurality of dielectric layers interposed therebetween; and
   an external electrode disposed on the body and connected to at least one of the plurality of internal electrodes,
   wherein one of the plurality of internal electrodes includes an alloy metal including nickel, tin and aluminum,
   wherein the one of the plurality of internal electrodes includes a core internal electrode including a first surface and a second surface opposing each other, and a capping internal electrode disposed on the first surface of the core internal electrode and the second surface of the core internal electrode, and
   wherein the capping internal electrode includes a first alloy region including an alloy of nickel and aluminum.

2. The electronic component of claim 1, wherein the capping internal electrode further includes a second alloy region including an alloy of nickel and tin.

3. The electronic component of claim 2, wherein an area ratio of the first alloy region is different from an area ratio of the second alloy region.

4. The electronic component of claim 2, wherein the internal electrode further includes a tin oxide film disposed between the second alloy region and the dielectric layer.

5. The electronic component of claim 1, wherein the internal electrode includes an aluminum oxide film disposed between the capping internal electrode and the dielectric layer.

6. The electronic component of claim 5, wherein the aluminum oxide film is disposed on the first alloy region.

7. The electronic component of claim 1, wherein the capping internal electrode further includes a second alloy region including an alloy of nickel, aluminum, and tin.

8. The electronic component of claim 1,
   wherein the one of the plurality of internal electrodes includes one surface opposing one of the plurality of dielectric layers, and
   wherein the capping internal electrode defines 80% or more of the one surface of the one of the plurality of internal electrodes.

9. The electronic component of claim 1, wherein the core internal electrode is a baked electrode including nickel.

10. The electronic component of claim 1, wherein the alloy metal is included in an amount of 0.1 weight % or more and 15 weight % or less based on 100 weight % of nickel.

11. The electronic component of claim 1, wherein weight % of aluminum included in the internal electrode is greater than weight % of tin included in the internal electrode.

12. The electronic component of claim 1, wherein the one of the plurality of internal electrodes includes at least one or more of copper (Cu), silver (Ag), lead (Pb), platinum (Pt), rhodium (Rh), iridium (Ir), ruthenium (Ru), osmium (Os), indium (In), gallium (Ga), zinc (Zn) and bismuth (Bi).

13. An electronic component, comprising:
    a body including a plurality of dielectric layers, and a plurality of internal electrodes disposed with a corresponding one of the plurality of dielectric layers interposed therebetween; and
    an external electrode disposed on the body and connected to at least one of the plurality of internal electrodes,
    wherein one of the plurality of internal electrodes includes an alloy metal including nickel, tin and aluminum,
    wherein the one of the plurality of internal electrodes includes a core internal electrode including a first surface and a second surface opposing each other, and a capping internal electrode disposed on the first surface of the core internal electrode and the second surface of the core internal electrode,
    wherein the capping internal electrode includes a first alloy region including an alloy of nickel and aluminum, and a second alloy region including an alloy of nickel and tin, and
    wherein an area of the first alloy region covering the first surface of the core internal electrode is larger than an area of the second alloy region covering the first surface of the core internal electrode.

14. The electronic component of claim 13,
    wherein the one of the plurality of internal electrodes includes one surface opposing one of the plurality of dielectric layers, and
    wherein the capping internal electrode defines 80% or more of the one surface of the one of the plurality of internal electrodes.

15. The electronic component of claim 13, wherein the one of the plurality of internal electrodes includes an aluminum oxide film disposed between the first alloy region and one of the plurality of dielectric layers.

16. The electronic component of claim 15, wherein the one of the plurality of internal electrodes further includes a tin oxide film disposed between the second alloy region and the one of the plurality of dielectric layers.

17. The electronic component of claim 13,
    wherein the alloy metal is included in an amount of 0.1 weight % or more and 15 weight % or less based on 100 weight % of nickel, and
    wherein weight % of aluminum included in the one of the plurality of internal electrodes is greater than weight % of tin included in the one of the plurality of internal electrodes.

* * * * *